Aug. 29, 1961 P. B. MURPHY 2,998,596

TRANSLATOR AND DISPLAY DEVICE

Filed Dec. 5, 1957 2 Sheets-Sheet 1

INVENTOR
P. B. MURPHY
BY Kenneth B. Hamlin
ATTORNEY

INVENTOR
P. B. MURPHY
BY Kenneth B. Hamlin
ATTORNEY

United States Patent Office 2,998,596

Patented Aug. 29, 1961

2,998,596

TRANSLATOR AND DISPLAY DEVICE

Paul B. Murphy, Grand View, N.Y., assignor to Bell Telephone Laboratories, Incorporated, New York, N.Y., a corporation of New York Filed Dec. 5, 1957, Ser. No. 700,911
14 Claims. (Cl. 340—324)

This invention relates to digital translators and display systems and more particularly to devices for translating binary information to digital information and displaying the digital information thus translated.

In present day business and other activities vast amounts of information must be transmitted between remote locations and this information has been found to be most advantageously handled when first translated into a binary system of numbering and then transmitted as electrical signal pulses representing values in the binary system. While binary pulses are most advantageously handled from a transmission standpoint, the binary notation does not lend itself to rapid comprehension by one receiving information in that notation who may be more familiar with the universally known decimal system of numbering. Accordingly, it has been found necessary to provide translators to enable individuals to introduce into and to receive information in one system of notation from the transmission link which conveys the information in another system of notation.

A typical example of a system in which large amounts of information must be handled is one concerned with the transmission of stock market quotations from one remote point to another. Assume, for example, a request from a securities investment firm in Chicago for the current quotation of a particular one of a large group of stocks listed on the Stock Exchange in New York. A decimal code number assigned to the particular stock is determined and this code number must first be translated in order to be acceptable to the binary transmission system over which the request is to be conveyed to New York. A second translation must be made in Chicago from the binary system to the decimal system by an output device of the information transmitted from New York and this translated information must be displayed in response to the request.

Accordingly, it is an object of this invention to provide improved systems and devices for translating information from one system of notation to another and displaying such information.

It is a further object of this invention to accomplish both the introduction of decimal information into a binary information handling system and the display of translated decimal information from that system.

These and other objects of this invention are attained in one specific embodiment thereof wherein a display drum has associated therewith a sixteen position detent mechanism and a spur gear. The sixteen positions correspond to the digital characters 0 through 9 and six extra characters which may represent optional non-decimal information. The characters are imprinted on the surface of the drum in positions which are visible one at a time through an aperture provided in a panel surface under which the unit is mounted. The gear is engaged by a second gear having concentrically mounted therewith four cam wheels, the surfaces of which are indented so that the appearances of the indentations correspond to a binary code.

Cam followers in the form of finger springs ride each cam surface and also operate as armatures of individual contact spring assemblies. Two sets of such spring assemblies are provided for each cam surface, one set being utilized in a translation circuit for information received from the information handling system and the other set being utilized in a translation circuit for introducing information into the system.

The second gear is meshed with a pinion gear concentrically attached to a friction drive wheel. A rotating drive shaft, which may be common to a bank of display devices in accordance with this invention, is provided, the drive shaft having friction wheels thereon. The pinion gear is arranged to be rotated about the second gear to move its concentric friction wheel into engagement with one of the friction wheels of the drive shaft.

In accordance with an aspect of this invention, when information is to be displayed, an electromagnet is energized, its armature operating to move the friction wheel into engagement with a rotating friction wheel of the drive shaft, thereby causing the display drum to rotate. When the position of the drum corresponds to the incoming information, as indicated by the armatures of the contact springs associated with the cam followers for each cam wheel, the supply current to the electromagnet is interrupted. As a result the friction wheels are disengaged and the rotation of the display drum is also interrupted.

As noted above, the display drum also has mounted with it a detent mechanism. In accordance with another aspect of this invention a pawl is provided which is adapted to engage the detents of the drum by means of a guide wheel. The guide wheel rides the detents of the drum and controls the action of the pawl which has a spring biased arm associated therewith. A separate pair of contacts included in the control circuit of the electromagnet are operated by the pawl arm to close the control circuit whenever the guide wheel is positioned between the detents of the drum wheel. Deenergization of the electromagnet is thus prevented unless the contact springs are open and accurate interruption of the rotation of the display drum at a point where only a single information character is fully displayed is thus assured. Misreading of information, due to appearances of more than one character through the display aperture in the mounting panel is thereby prevented. The guide wheel positioned between detents, because of the spring bias, also serves to lock the display drum in position and prevent overshoot of the drum after the current to the control electromagnet has been interrupted.

When it is desired to introduce information into the information handling and transmission system, the display drum is manually rotated until the desired information character appears. The position of the display drum is thus made to correspond to a particular setting of the armatures of the second set of cam follower spring contacts. This circuit combination corresponding to the digit or information symbol selected can then be transmitted to an associated electrical register upon the operation of a control switch.

It is a feature of this invention that a display drum have operatively connected thereto through mating gears a plurality of cam wheels, each of the cam wheels having contact spring arms riding thereon and controlling combinations of spring groups. Further, in accordance with this feature, the cam wheels are driven by a friction wheel which engages a friction wheel on a drive shaft under control of the armature of an electromagnet, current to the electromagnet in turn being controlled by the circuit setting of the cam follower spring assemblies.

It is a further feature of this invention that detents be provided on the display drum, which detents are adapted to control the movement of an associated pawl, an arm of which in turn controls a pair of contacts. In accordance with this feature of the invention the contacts control the supply circuit to prevent the interruption of current to the electromagnet except when the characters on the display drum are properly positioned beneath the viewing aperture or are otherwise in proper viewing position to preclude misinterpretation of the digital or other information displayed.

A complete understanding of these and various other features of this invention may be gained from a consideration of the following detailed description when taken in conjunction with the accompanying drawing, in which.

Figures 1, 2:
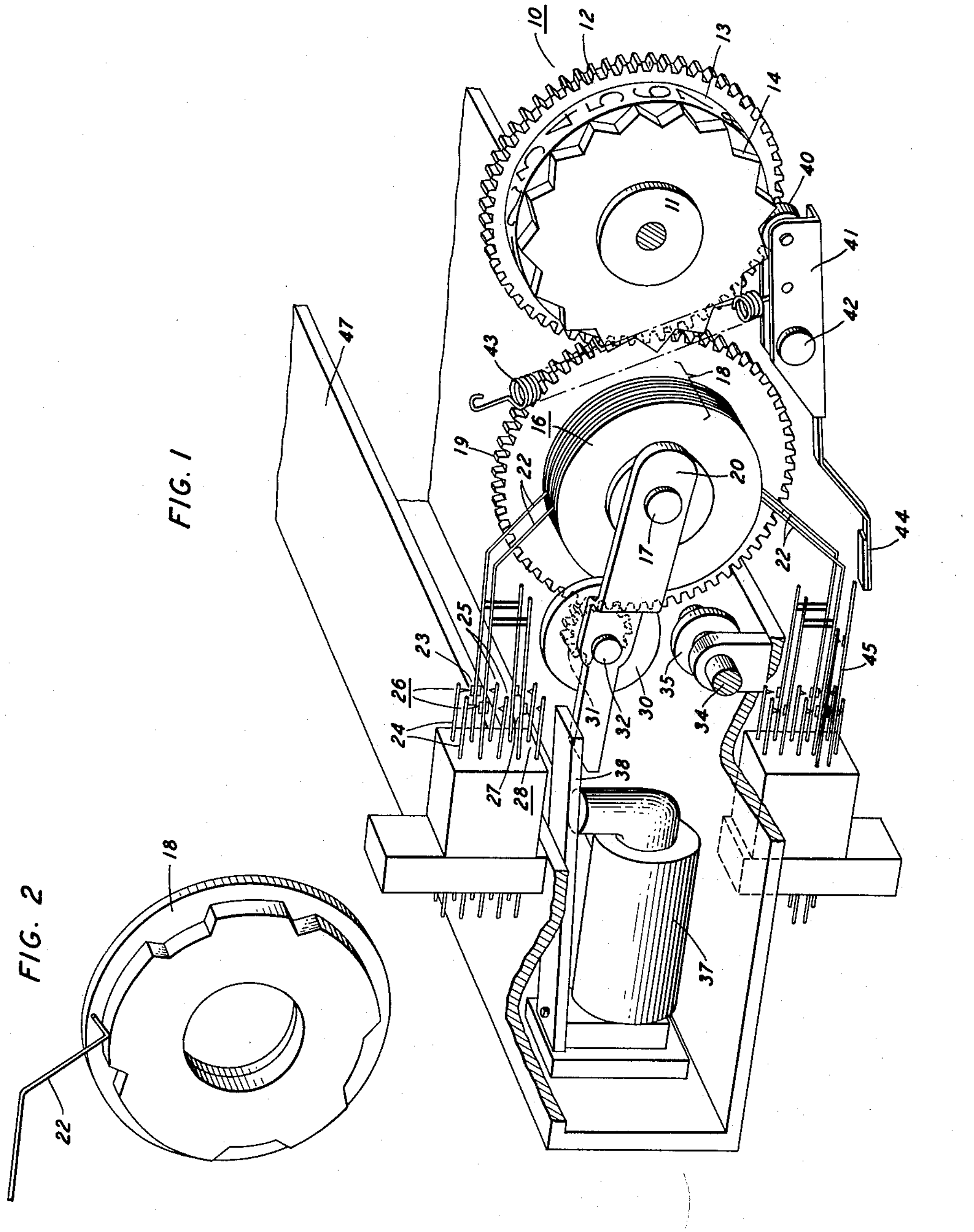
FIG. 1 is a perspective view of a display device and translator mechanism in accordance with one specific illustrative embodiment of this invention, various supporting and cover members not being shown for reasons of clarity.
FIG. 2 is a perspective view of one of the cam wheels employed in the embodiment of FIG. 1.

Turning now to the drawing, the display drum 10 is seen as mounted on a shaft 11 secured to side walls or brackets, not shown. The drum 10 comprises a spur gear 12, a display surface 13, on which the digital and other information is printed, and a plurality of detents 14, each detent being positioned adjacent an interval between information characters. In this specific embodiment sixteen digital and other information symbols are imprinted on the surface 13 in positions to be seen one at a time through a rectangular aperture in the surface of the panel, not shown, in connection with which the device is to be mounted. Additionally, part of the gear 12 advantageously protrudes through a slot in the mounting panel in such a way as to provide convenient means for manually setting up the characters to be introduced into a register from the device, as described hereinafter.

Adjacent the display drum 10 is a cam assembly 16 mounted on a shaft 17, also supported from side panels or brackets, not shown. The cam assembly 16 includes, in this specific embodiment, four cam wheels 18, a spur gear 19 meshing with gear 12, and an arm 20. A wire cam follower 22 is provided to ride on the surface of each of the cam wheels 18, each of which, as more clearly seen in FIG. 2, has a cammed or indented surface. Specifically, the indentations on the four cam wheel surfaces are arranged to actuate four followers 22 in accordance with a desired binary code, a raised portion representing one binary value and an indented portion the other value. Either conventional binary codes or a special binary code may be utilized as desired and as may be required by the information handling and transmission system with which this device is to be utilized.

As shown in FIG. 1, each of the wire cam followers 22 is provided with contacts 23 so that the cam follower springs 22 serve as the transfer swingers or armatures with associated spring contacts 24 and 25 of a contact assembly 26. Additionally, the cam follower springs 22 are mechanically linked to contact members 27 of second spring assemblies 28. Advantageously, the transfer contact assemblies 26 may be employed for translating information supplied by the transmission link and displaying it on the display drum 10 while the second contact assemblies 28 may be utilized for manually setting the display drum 10 to introduce input data into the transmission and information handling system.

Mounted on the arm 20 is a friction drive wheel 30 and a pinion drive gear 31 meshing with the gear 19. Drive wheel 30 and gear 31 are mounted on a common shaft 32 which is mounted only on the arm 20, the arm 20 being free to pivot on the shaft 17. A motor or other drive means, not shown, operatively rotates a drive shaft 34 on which is rigidly mounted a second friction drive wheel 35, the latter wheel engaging wheel 30 when the display drum 10 is to be rotated.

In FIG. 1 the friction drive wheels are shown as disengaged. When the drive wheels are to be engaged, a clutch electromagnet 37 is energized, causing its armature 38 to urge one end of arm 20 to pivot on the shaft 17, thereby bringing the friction drive wheel 30 into engagement with the rotating friction drive wheel 35. As the display drum 10 rotates, a guide wheel 40 rides the detents 14 on the display drum 10. The wheel 40 terminates one end of a detent pawl 41 which in turn is pivotally mounted on a shaft 42 secured to the side plates or brackets of the device, not shown. The pawl 41 is spring biased by a spring 43 to maintain the guide wheel 40 in engagement with the detents 14, the end of the spring 43 also being advantageously secured to the side plate of the device. The pawl 41 has a control arm 44 which opens and closes contacts 45 as determined by whether the guide wheel 40 rides on or between the detents 14.

The electromagnet, the spring assemblies, the drive shaft 34, the motor, not shown, and the side plates or brackets, also not shown, are advantageously all secured to a common mounting channel 47 which may also advantageously serve as the mounting means for a row or bank of display devices in accordance with this invention.

Figure 3:
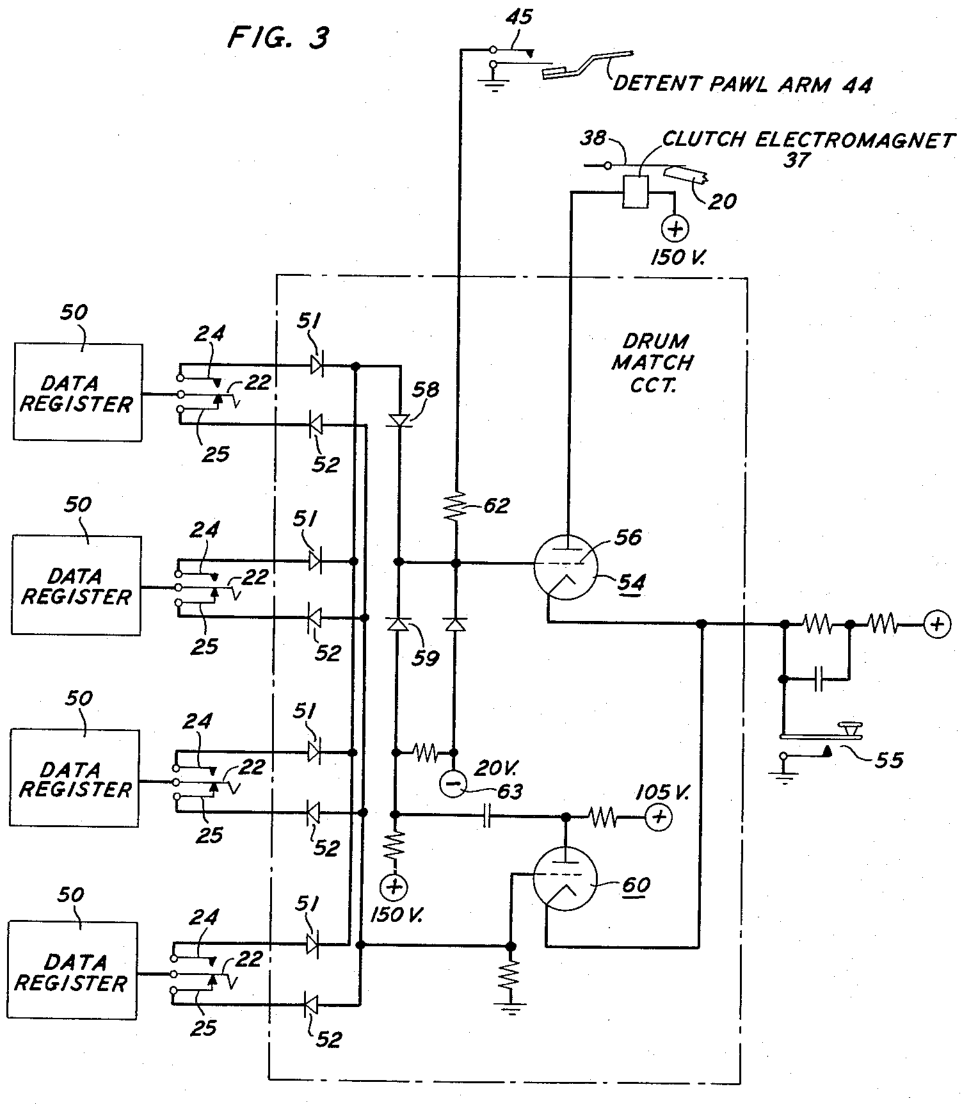
FIG. 3 is a schematic representation of an illustrative circuit in which the device of FIG. 1 may be employed for the translation and display of binary information in digital form.

Turning now to FIG. 3, there is disclosed one illustrative arrangement for a match circuit which may advantageously be employed with the display devices of this invention. The information to be visually presented by the display drum 10 is initially stored in binary code form in temporary data registers 50 which may be vacuum tube flip-flops or other electronic storage circuits known in the art. In this specific illustrative embodiment the registers 50 have an output signal of −24 volts to indicate a stored binary "0" and an output signal of −1.4 volts to indicate a stored binary "1." These stable signals from the registers 50 are applied to the movable transfer contacts 23 of each of the four sets of spring assemblies 26, the transfer contacts 23 being on the cam follower springs 22, as described above. As the movable contact 23 transfers between the upper and lower contacts 24 and 25 of the contact spring assemblies 26 under the control of a cam wheel 18, −24 volts or −1.4 volts is applied to a "0" and a "1" match circuit through diodes 51 and 52, respectively.

The flow of supply current to the electromagnet 37, in order to effect the engagement of the drive wheels 30 and 35 and thus rotate the display drum 10, is controlled by a vacuum tube 54 which conducts when the switch 55 is closed, provided that neither match circuit indicates a match between the transfer contact positions and the stored information in registers 50. The tube 54 will conduct, although a slightly negative bias is applied to its grid 56, and will then supply sufficient current to the electromagnet 37 to cause the armature 38 to depress the arm 20, thereby engaging the friction drive wheels 30 and 35. Connected to the grid 56 of tube 54 is an OR circuit comprising diodes 58 and 59. Diode 58 is connected to the diodes 51 of the "0" match circuit directly, the diodes 51 comprising an AND circuit. Diode 59 is connected to the diodes 52 of the "1" match circuit through an inverting vacuum tube 60, the diodes 52 also comprising an AND circuit.

The operation of the drum match circuit can best be appreciated by considering the four possible match conditions. If the AND circuit comprising diodes 51 is not enabled, thereby indicating no match for the "0" AND circuit, at least one of the diodes 51 will cause the voltage applied through the OR circuit diodes 58 to the control grid 56 to be −1.4 volts, thereby permitting the tube 54 to conduct. Similarly, if one of the diodes 52 of the "1" AND match circuit does not have a "1" signal applied to it, then the tube 60 will be conducting and the signal applied through the OR circuit diode 59 to the control grid 56 will also permit the control tube 54 to conduct. Thus, if there is no match on either the AND gate diodes 51 or the AND gate diodes 52, then signals will be applied through both OR diodes 58 and 59 to cause tube 54 to conduct.

However, when there is a match at the diodes 51, a —24 volt signal is applied through the OR circuit diode 58 to the control grid 56 and if, simultaneously, there is a match at the diodes 52, the inverter tube 60 provides a comparable negative voltage so that the control grid is biased sufficiently negative to cut off conduction in the tube 54 and thus deenergize the clutch electromagnet 37, provided that contacts 45 are open. As long as contacts 45 are closed, bias is applied to the control grid 56 through these contacts from ground, thereby keeping the tube 54 conducting in spite of the action of the match circuits above described.

The operation of the contacts 45 may be considered separately from the operation of the drum match circuit just described. After the operate signal has been applied to the tube 54 by the closure of the switch 55, the display drum starts to rotate. The resulting motion closes the detent contacts 45 which apply a ground potential to the grid 56 through an isolation resistor 62, which may be employed to reduce the effect of the wiring capacity to ground associated with the contacts 45. As the display drum 10 rotates, the contacts 45 open each time a new symbol is displayed through the display drum viewing aperture as controlled by the pawl 41 and its arm 44. Each opening of these contacts permits the operate signal to be reapplied to the grid 56 so long as a mismatch exists, as described above, but when a drum match occurs, this signal ceases to be generated. Therefore, at the next opening of the contacts 45 the application of a —20 volt signal to the tube 54 is permitted from a source 63, which signal reduces the current through the tube 54 sufficiently to deenergize the clutch electromagnet 37, if not cutting off the tube entirely. The deenergization of the electromagnet permits the mechanical detent arrangement to stop the display drum abruptly on the symbol position, thereby preventing the contacts 45 from again closing.

To use the display drum to introduce information into the transmission and information handling system, the gear 12 is rotated manually until the desired digital or other symbol appears at the viewing aperture. At this time the spring contacts 27 are opened or closed as determined in accordance with the binary code represented by the cam positions of the cam wheels 18 for that digit or symbol. By actuating a control key, the operator may then transfer the information represented by the circuit combinations of these switches to electronic temporary storage registers, as are well known in the art.

It is to be understood that the above-described arrangements are merely illustrative of the application of the principles of the invention. Numerous other arrangements may be devised by those skilled in the art without departing from the spirit and scope of the invention.

What is claimed is:

1. A translating and display device comprising a rotatable drum having symbols displayed on the periphery thereof, a plurality of cam wheels rotatable with said drum, drive means for rotating said drum, an electromagnet, means responsive to the energization of said electromagnet for actuating said drive means, means including contact springs operated by said cam wheels for deenergizing said electromagnet, a plurality of detents mounted on said drum and associated, respectively, with said symbols, and means including a pawl engaging said detents for preventing deenergization of said electromagnet by said last-mentioned means except when said pawl is engaged between said detents.

2. A translating and display device in accordance with claim 1 wherein said rotatable drum includes a first spur gear, a second spur gear engaging said first gear and mounted on said cam wheels, said drive means for rotating said drum including said first and second spur gears and further including a third spur gear engaging said second gear.

3. A translating and display device in accordance with claim 2 wherein said drive means also includes a rotating shaft having a friction wheel thereon and a second friction wheel coaxial with said third spur gear.

4. A translating and display device comprising a drum having symbols displayed on the periphery thereof and being rotatable to a plurality of positions, a first spur gear and a plurality of detents coaxially mounted with said drum, a plurality of cam wheels, a second spur gear coaxially mounted with said cam wheels and engaging said first spur gear, drive means including a rotating shaft and a first clutch member, a third spur gear engaging said second spur gear and a second clutch member coaxially mounted with said spur gear, an electromagnet, means responsive to the energization of said electromagnet for causing said second clutch member to engage said first clutch member, means including contact springs operated by said cam wheels for deenergizing said electromagnet, and means for preventing deenergization of said electromagnet when said drum is between said positions, said last-mentioned means including a pair of contact springs, a pawl riding said detents, and an arm actuated by said pawl for opening and closing said pair of contact springs.

5. A translating and display device comprising a rotatable drum having symbols displayed on the periphery thereof and a plurality of detents coaxially mounted with said drum, drive means for rotating said drum, means including an electromagnet for operating said drive means, means for deenergizing said electromagnet on rotation of said drum to the display of a predetermined symbol, and means for preventing said deenergization of said electromagnet, said last-mentioned means including a pawl riding said detents, a pair of contact springs, and an arm actuated by said pawl for opening and closing said pair of contact springs.

6. A translating and display device comprising a rotatable drum having symbols displayed on the periphery thereof and a first spur gear coaxially mounted therewith, a plurality of cam wheels and a second spur gear coaxially mounted therewith and engaging said first gear, a contact spring member riding on each of said cam wheels, first spring contact assemblies each including one of said contact spring members, second contact assemblies each including a first member mechanically linked to one of said contact spring members, means for rotating said plurality of cam wheels to positions corresponding to particular operative combinations of said second contact assemblies, and means for driving said second gear to rotate said drum.

7. A translating and display device in accordance with claim 6 wherein said drive means includes clutch means, a rotating drive shaft having a pinion thereon, an electromagnet, means for energizing said electromagnet to cause said clutch means to engage said pinion and said second gear, and means controlled by the operative combinations of said first spring contact assemblies for deenergizing said electromagnet.

8. A translating and display device in accordance with claim 7 further comprising means for preventing deenergization of said electromagnet comprising a plurality of detents mounted on said drum and associated respectively with said symbols, pawl means riding said detents, a third contact spring assembly, and an arm actuated by said pawl means for opening and closing said third contact spring assembly as said drum rotates.

9. In an information transmission system, terminal apparatus comprising a plurality of circuit means each including a source of input signals, a first plurality of contact spring pairs for enabling respectively said plurality of circuit means, a coding wheel having a plurality of cams each being arranged in accordance with a predetermined code, a plurality of armature means respectively following said cams for operating said contact spring pairs, drive means for rotating said coding wheel, interrupting means responsive to particular combinations of said input signals on said circuit means when said circuit means are enabled for controlling said drive means to interrupt the rotation of said coding wheel at cam positions corresponding to said combinations of input signals, a second plurality of contact spring pairs, said plurality of armature means also operating said second plurality of contact spring pairs, and means for manually rotating said coding wheel to cam positions corresponding to particular combinations of said second plurality of contact spring pairs.

10. In an information transmission system, terminal apparatus according to claim 9 in which said means for manually rotating said coding wheel comprises an indicator drum corotatable with said coding wheel, said drum having indicia on the periphery thereof indicative of said cam positions of said coding wheel.

11. In an information transmission system, terminal apparatus according to claim 10, also comprising indexing means for said indicator drum comprising a plurality of detents on said drum, pawl means engaging said detents, and means operated by said pawl means for disabling said interrupting means.

12. A translating and display device comprising a coding wheel having a plurality of cams thereon, a display drum corotatable with said coding wheel and having a plurality of symbols on the periphery thereof, a plurality of detents on said display drum associated respectively with said plurality of symbols, drive means including energizing circuit means for rotating said coding wheel, a plurality of contact springs for controlling said energizing circuit means, means operated by said plurality of cams for operating respectively said plurality of contact springs, means operated responsive to the operation of particular combinations of said plurality of contact springs for disabling said energizing circuit means, and means operated by one of said detents for preventing said disabling of said energizing circuit means.

13. A translating and display device according to claim 12 in which said last-mentioned means comprises pawl means, additional contact springs for also controlling said energizing circuit means, and means operated by said pawl means for operating said additional contact springs.

14. A translating and display device according to claim 12 also comprising a second plurality of contact springs, means also operated by said plurality of cams for operating respectively said second plurality of contact springs, and means for manually corotating said coding wheel and said display drum to display particular symbols on said drum comprising a plurality of teeth on the periphery of said drum.

References Cited in the file of this patent

UNITED STATES PATENTS

| | | |
|---|---|---|
| 2,046,977 | Sortore et al. | July 7, 1936 |
| 2,675,961 | Larsen | Apr. 20, 1954 |
| 2,676,289 | Wulfsberg et al. | Apr. 20, 1954 |
| 2,718,634 | Hansen | Sept. 10, 1955 |
| 2,754,500 | Lazich | July 10, 1956 |
| 2,783,464 | Canepa | Feb. 26, 1957 |
| 2,871,467 | Hailey | Jan. 27, 1959 |